(12) United States Patent
Liang

(10) Patent No.: US 7,626,708 B2
(45) Date of Patent: Dec. 1, 2009

(54) PHASE SHIFTING GRATING-SLIT TEST FOR OPTICAL SURFACE RECONSTRUCTION

(76) Inventor: Chao-Wen Liang, No. 6-2, Da-Min Street, West District. Taichung City 403 (TW)

( * ) Notice: Subject to any disclaimer, the term of this patent is extended or adjusted under 35 U.S.C. 154(b) by 407 days.

(21) Appl. No.: 11/790,633

(22) Filed: Apr. 26, 2007

(65) Prior Publication Data

US 2007/0252975 A1    Nov. 1, 2007

(51) Int. Cl.
G01B 9/02 (2006.01)
G01B 11/02 (2006.01)

(52) U.S. Cl. ...................... 356/521; 356/515

(58) Field of Classification Search ......... 356/511–515, 356/521; 250/237 G
See application file for complete search history.

(56) References Cited

U.S. PATENT DOCUMENTS

| 5,004,337 | A | * | 4/1991 | Dey | 356/124 |
| 5,013,133 | A | * | 5/1991 | Buralli et al. | 359/558 |
| 6,409,345 | B1 | * | 6/2002 | Molebny et al. | 351/212 |
| 6,932,475 | B2 | * | 8/2005 | Molebny et al. | 351/215 |
| 6,940,649 | B2 | * | 9/2005 | Dowski, Jr. | 359/558 |
| 7,554,731 | B2 | * | 6/2009 | Dowski, Jr. | 359/558 |
| 7,554,732 | B2 | * | 6/2009 | Dowski, Jr. | 359/558 |

* cited by examiner

*Primary Examiner*—Patrick J Connolly
(74) *Attorney, Agent, or Firm*—Muncy, Geissler, Olds & Lowe, PLLC

(57) ABSTRACT

An optical system representing the configuration of a tested element disposed therein is provided. The optical system comprises a light source emitting a spatial-incoherent light having a phase shifting scheme toward the tested element and then forming an image with a transverse ray aberration on the image plane of the tested element; a spatial filter on the image plane to spatially filter the image formed by the tested element; and a detection module comprising a detector for receiving the spatially filtered image.

29 Claims, 12 Drawing Sheets

PHASE SHIFTING GRATING-SLIT TEST FOR OPTICAL SURFACE RECONSTRUCTION

BACKGROUND OF THE INVENTION

1. Field of the Invention

The invention relates to an optical system, and in particular to an optical system with a spatial filter to obtain traverse aberration of a test element.

2. Description of the Related Art

Since its development (Kirkham, The Ronchi test for mirrors, in Amateur Telescope Making. 1953. p. 264.) by the Italian Vasco Ronchi in 1923, professionals and amateur opticians have used the Ronchi test to evaluate surface figure errors in optics. Although there are other geometrical test methods, such as the Foucault and wire test, performed at or near the focal plane of an optical system, these methods do not quantify surface errors as well. Unlike the evolution in sophistication of interferometric testing methods, the Ronchi test has not been improved considerably from its original arrangement. Many laboratory institutions and optical shops still use the Ronchi test in its original form. The modified Ronchi test that uses an extended light source and a matching grating is also more than 50 years old. In some cases the Ronchi test is still considered to be the main apparatus for coarse surface testing before an interferometer is used for more precise measurement.

The Ronchi test has been primarily used in a qualitative approach rather than in a quantitative manner. The fringes observed in the Ronchi test convey qualitative information used to improve the figure of an optical surface. For example, by comparing actual test fringes with computer generated fringes, an experienced optician can guide and correct the figure of an optical surface. However, it is possible even for an experienced optician to misinterpret the Ronchi patterns and make figuring mistakes. Despite publication of methods to quantify the Ronchi test measurements, there are still no commercial quantitative Ronchi testers available.

The Ronchi test can be explained by using geometrical optics. The geometrical theory has been explained by Malacara and is based on transverse aberration theory. Transverse aberrations are related to the derivatives of the wavefront deformation at the exit pupil of the optical system under test.

With reference to FIG. 1, a simplified optical system with a wavefront deformation W at the exit pupil has a paraxial radius r. The transverse ray aberration at the observation plane is TAy.

The derivative of the wavefront deformation W(Xp,Yp) is related to the transverse ray aberrations TAy by the formula, $$\frac{\partial W(X_p, Y_p)}{\partial X_p} = \frac{-TA_y}{r - W} \quad (1-1)$$

For wavefront aberration, W, is very small compared with r and therefore W can be ignored, simplifying the formula to, $$\frac{\partial W(X_p, Y_p)}{\partial Y_p} = \frac{-TA_y}{r} \quad (1-2)$$

Thus a simple formula is provided between the Y-component of the transverse ray aberration and the derivative of the wavefront. The quantity TAy is the Y-position where the ray intercepts the observation plane. The transverse ray aberration TAy is what can be measured by using the Ronchi test.

As shown in FIG. 2 in the traditional Ronchi test, a grating, either binary or sinusoidal, is placed at or near the paraxial focus of the aberrated beam. Dark fringes appear when the ray interception on the grating plane is coincident with a grating line so that light is blocked by the grating. The periodicity of the grating used in the Ronchi test permits quantification of the transverse ray aberration as conveyed by the fringes. Formula (1-3) describes light rays blocked by one of the grating's lines or dark bands, $$TA_x = r \times \frac{\partial W}{\partial X_p} = Nd \quad (1-3)$$

Where d is the pitch of the grating and N represents an integer. By analogy, if the grating is rotated by 90° to be parallel to the X-axis, dark fringes occur when, $$TA_y = r \times \frac{\partial W}{\partial X_p} = Nd \quad (1-4)$$

If the two transverse ray aberration functions TAx(Xp, Yp) and TAy(Xp, Yp) are known, integration generates the wavefront aberration W at the exit pupil, such that measurement of the transverse ray aberrations in both directions is sufficient to reconstruct the wavefront aberration.

If the grating is placed on a micrometer-stage, paraxial focus position and marginal focus position can be determined by scanning along the Z-axis, allowing rough quantification of the amount of spherical aberration and determination of correction measures.

Geometrical tests that measure transverse ray aberrations are capable of measuring large figure errors and thus are useful in evaluating ground surfaces. The optical testing of a rough and large optical surface has been a practical problem in the field of large optical surface fabrication. The testing of ground surfaces with short wavelengths in the visible spectrum presents problems due to the strong light scattering from the rough surface. A small rough optical surface can be tested by using a mechanical stylus profilometer or an optical profilometer. However, due to the size limitations of profilometers, data reduction, and testing time, an interferometric test using a carbon dioxide laser at 10.6 micrometers is an option often used for large surfaces (Kwon, O., J. C. Wyant, and C. R. Hayslett, Rough-Surface Interferometry at 10.6-Mu-M. Applied Optics, 1980. 19(11): p. 1862-1869; Munnerly. Cr and M. Latta, Rough Surface Interferometry Using a Co2 Laser Source. Applied Optics, 1968. 7(9): p. 1858-&). Nonetheless, the invisible wavelength and high power output of the carbon dioxide laser increases the difficulties of the optical testing. One way to perform visible wavelength interferometry or other testing methods, such as the Foucault or Ronchi test, on a rough surface is by waxing the ground surface to reduce light scattering therefrom. Wax is applied to the ground surface and allowed to dry, and then it is buffeted to obtain a specular coating that allows optical testing. Another technique utilizes varnishing of the optical surface. Two experiments were conducted by varnishing ground optical surfaces to verify that sufficient specular light was reflected from the varnished surface to allow an optical test to be performed.

BRIEF SUMMARY OF THE INVENTION

An optical system employing a grating slit test method is provided. The grating-slit test uses similar elements to the Ronchi test but it is performed in a different manner. Specifically, an illuminated grating is used as an object and a slit is used at the image of the grating to produce fringes. The fringes convey the transverse ray aberrations of the light beam from the surface under test. The grating-slit test does not have the limitations of the Ronchi test regarding grating diffraction effects which trouble and limit the usefulness of the Ronchi test. In a quantitative geometrical test the measurement results provide the transverse ray aberrations at the observation plane. These transverse aberrations are of little use to the optician since the surface figure errors are needed. An algorithm is provided to reconstruct the surface figure errors from the observed transverse ray aberrations in a least square fit sense. In addition, phase-shifting is used to obtain the transverse ray aberrations. Thus, the combination of the grating-slit test, phase-shifting, and the surface reconstruction algorithm provides the necessary information to obtain optical surface figure errors.

An exemplary embodiment of an optical system of the invention comprises a light source emitting a spatial-incoherent light having a phase shifting scheme toward the tested element and then forming an image with a transverse ray aberration on the image plane of the tested element; a spatial filter on the image plane to spatially filter the image formed by the tested element; and a detection module comprising a detector for receiving the spatially filtered image.

The light source comprises: a light source emitting a light; and a light modulator having a plurality of valves modulating the light from the light source upon a time controller to generate the spatial-incoherent light having the phase shifting scheme.

The light source further comprises an integrator to generate an incoherent light incident on the light modulator. The light modulator is a liquid crystal panel, an optical MEMS switch or a LCoS, which modulates the incoherent light to emit the spatial-incoherent light having the phase shifting scheme. Each line of light valves is switched by the time controller and modulates the incoherent light as a sinusodial intensity grating.

The detection module further comprises a lens unit disposed between the spatial filter and the detector to relay the image formed by the tested element to the detector.

The spatial filter has an opening to spatially filter the image formed by the tested element. The spatial filter can be a slit, a cross slit or a hole. When the spatial filter is a slit, the spatial filter is moved to scan the image. When the spatial filter is a slit or a cross slit, the slit or cross slit is rotated to spatially filter the image.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 7b depicts the light modulator of FIG. 7a;

FIG. 7c depicts the spatial filter of FIG. 7a;

DETAILED DESCRIPTION OF THE INVENTION

Figure 1:
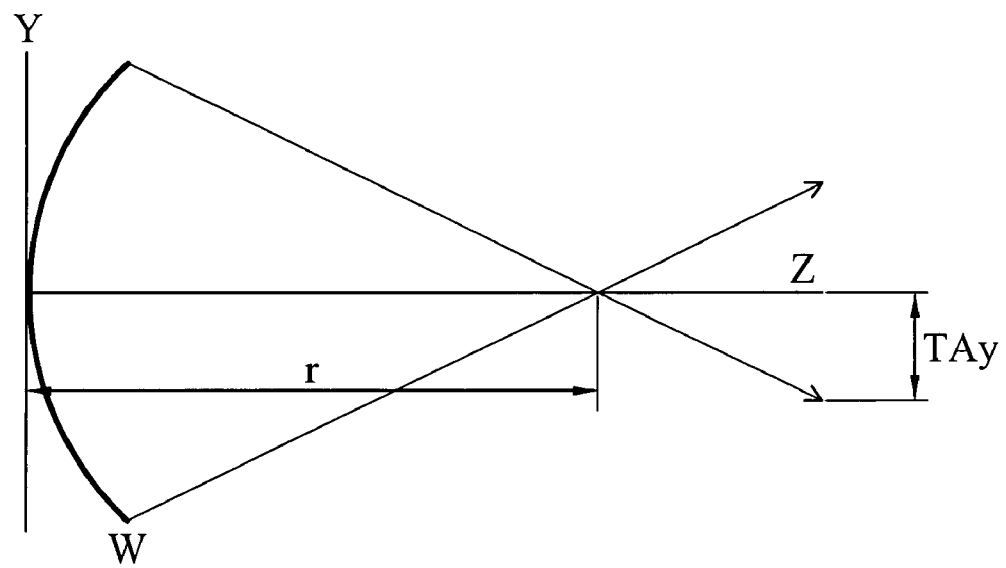
FIG. 1 depicts the relationship between the wavefront and the traverse ray aberration at an observation plane.
Figure 2:
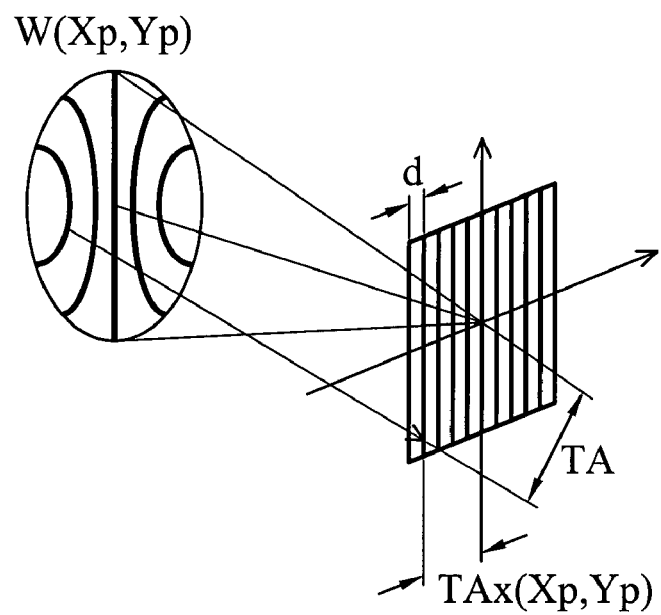
FIG. 2 is a schematic view of a conventional Ronchi test method.
Figure 3:
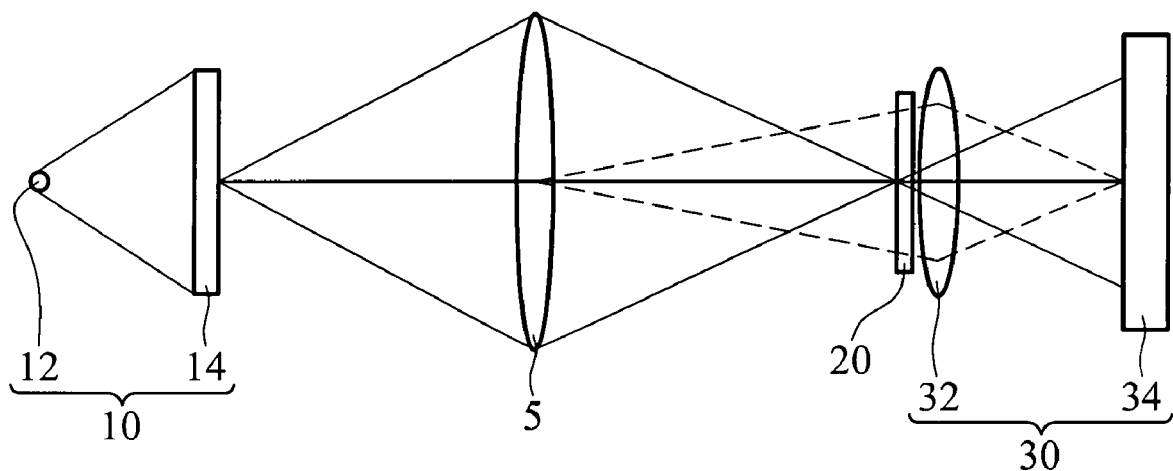
FIG. 3 is a schematic view of a grating slit test system of the invention.
Figure 4A:
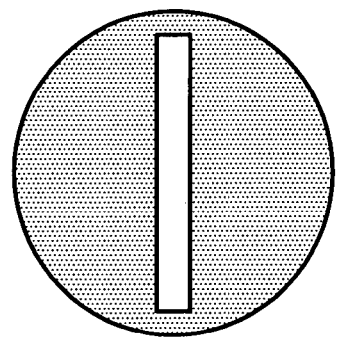
FIG. 4a~4c depict different types of spatial filter of the grating slit test system of the invention.
Figure 4B:
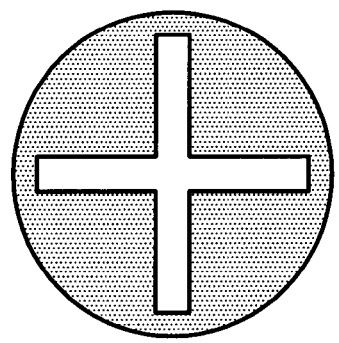
Figure 4C:
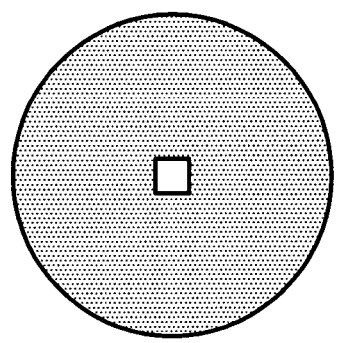

Referring to FIG. 3, an optical system 100 of the invention for the grating slit method comprises a light source 10, a spatial filter 20 and a detection module 30. The light source 10 comprises a light source 12 and a light module 14. The detection module 30 comprises a spatial filter 32 and an imaging lens 34. Light from the light source 12 is modulated by the light modulator 14 having a plurality of valves upon a time controller to generate a spatial-incoherent light having a phase shifting scheme. Each line of light valves is switched by the time controller and modulates the incoherent light as a sinusodial intensity grating. The light modulator 14 can be a liquid crystal panel, an optical MEMS switch or an LCoS. The phase shifting scheme is introduced later. The spatial-incoherent light passes through a test element 5 to form an image with traverse aberration on an image plane, which is filtered by the spatial filter 30 disposed on the image plane and received by a detector 34 via an imaging lens (lens unit) 34. In this embodiment, the detector 34 can be a CCD plane. The imaging lens 32 and the detector 34 constitute the detection module 30. The spatial filter 20 has an opening which can be a slit, a cross slit or a hole as shown in FIGS. 4a, 4b and 4c respectively. When the opening is a slit as shown in FIG. 4a, the spatial filter 20 moves to scan the image to generate fringes like in Ronchi test. The grating slit method is described as follows.

Figure 5:
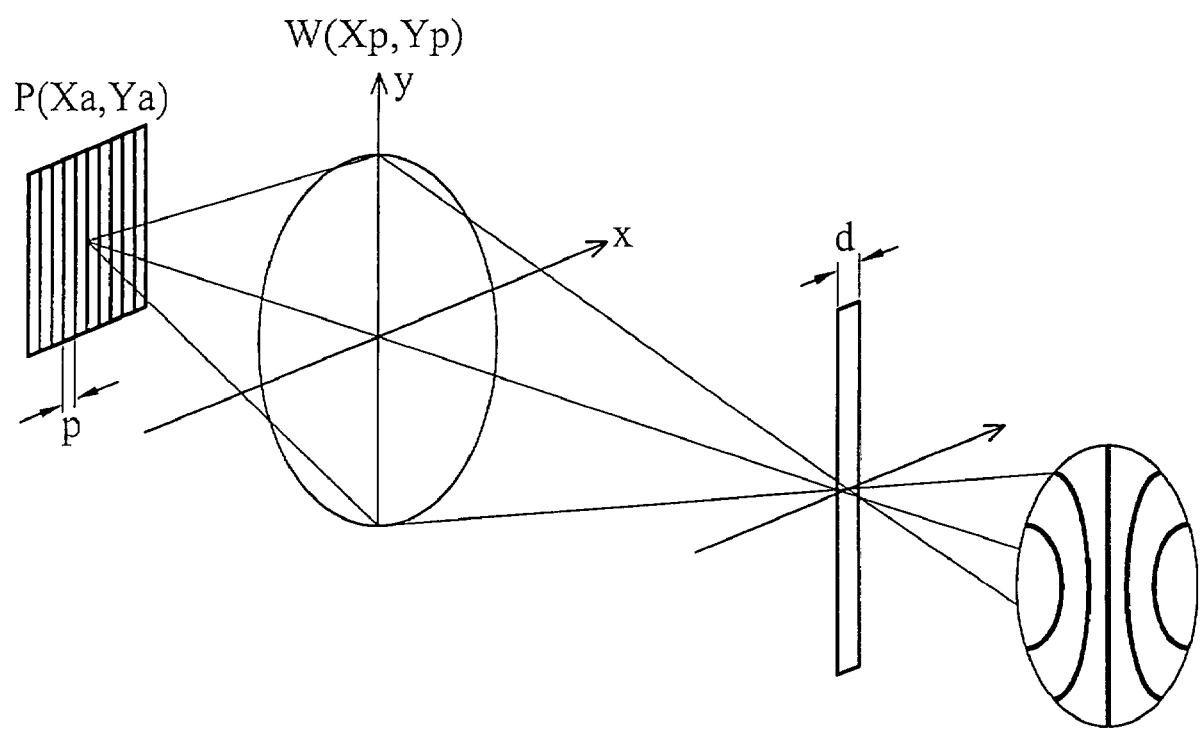
FIG. 5 is a schematic view of the grating slit test method of the invention.

FIG. 5 is a schematic view of the grating slit method. The grating-slit method can be explained by using a geometrical theory. Unlike the Ronchi test, where a ray is filtered by the grating at the focal plane, the grating-slit method uses only a slit to filter a ray. The grating-slit test requires its own geometrical theory involving a linear systems theory approximation. Since the observed fringes of the grating-slit test are equivalent to the fringes in the Ronchi test, both tests share some theoretical similarities.

Utilizing an incoherent light source that illuminates a grating in object space imaged by optics under test as shown in FIG. 5, the width of the single slit is d and it is parallel to the x-axis. The light intensity seen at the exit pupil is bright only when light passes through the slit. For small fields of view, that is, for a small grating, the wavefront function W is independent of the field position P(Xa,Ya). This linear systems invariant property is an important and very basic assumption in the grating-slit test.

For a point source P(Xa,Ya) located on the grating, light emitted therefrom passes through the slit only when the transverse ray aberration, TAx, satisfies the following formula, $$TA_x(Xa, Ya, Xp, Yp) = r \times \frac{\partial W(Xp, Yp)}{\partial Xp} + mXa \leq d/2 \qquad (2-1)$$

Where m is the magnification of the test configuration.

For simplicity, the slit width d can be taken as zero. Therefore, only when the transverse ray aberration in the x-direction is zero, light is set to pass through the slit. In mathematical terms this requires, $$r \times \frac{\partial W(Xp, Yp)}{\partial Xp} = -mXa \qquad (2-2)$$

If the grating used has a pitch p, bright fringes occur only when the position Xa at the object-grating satisfies the formula $$Xa = N \times P \qquad (2-3)$$

where N is an integer. Combining formulas (2-2) and (2-3) generates a result similar to the previous Ronchi test fringe formula (1-3).

$$r \times \frac{\partial W(Xp, Yp)}{\partial Xp} = -mNp \qquad (2-4)$$

The only difference from the Ronchi test is the magnification ratio which is multiplied with the grating pitch. This product is the pitch of the imaged grating at the focal plane. Thus, the grating-slit test is equivalent to the Ronchi test when the imaged grating is replaced for a frequency matching real grating at the focal plane.

In the grating-slit test a point at the grating plane produces an image or spot that represents a point spread function. This spot is linearly shifted and intensity modulated by the object sinusoidal grating. The slit of width d in turn samples and modulates each of the shifted spots. Both the spots and the slit are spatially coincident. The slit can be considered to scan linearly the spots from different object locations. The lateral position of the spots is modulated into the fringes at the observation plane. The observed fringes of the grating-slit test appear as the observed fringes in the traditional Ronchi test, or so called "Ronchigram". The modulation of the fringes is from the modulation of the object sinusoidal intensity grating, in contrast to the traditional Ronchi test where the entire Ronchigram is created from a single point source. Although the traditional Ronchi test can be used with an extended light source, each point in the extended source contributes the same whole Ronchigram and linearly imposed with other in intensity.

If functions TAx and TAy are known, it is possible to reconstruct the wavefront W from two orthogonal directions. The traverse aberration TAx can be obtained by the phase shifting scheme, as follows.

The spatial filter 20 with a slit opening is used in for description of the phase shifting scheme, although cross hair or hole provide similar phase shifting applicability.

The spatial light modulator is programmed to generate a cosine grating parallel to Y axis, and light uniformly radiates in all directions so that the entrance pupil of the optical system tested is uniformly illuminated.

$$I = I_0[1 + \cos(kDx)] \qquad (2-5)$$

Thus in the observation plane, a Ronchigram-like fringe is formed only when light passes through the slit and satisfies the formula $$TA_x(Xa, Ya, Xp, Yp) = r \times \frac{\partial W(Xp, Yp)}{\partial Xp} + mXa = 0 \qquad (2-6)$$

wherein the width d in formulas 2-1 is assumed to be zero.

The intensity formula on the observation with all radiation-related constants dropped is $$I(Xp, Yp) = I_0[1 + \cos(kXa)] \qquad (2-7)$$

$$= I_0\left[1 + \cos\left(\frac{k}{m}TAx(0, 0, Xp, Yp)\right)\right]$$

By using sinusoidual grayscale grating generated on the spatical light modulator, the intensity of Ronchigram like pattern is a function of position Tax, TAy. By inputting step phase, 4 frames are recorded:

$$I_1(Xp, Yp) = I_0\left(1 + \cos\left(\frac{k}{m}TAx + 0\right)\right) \qquad (2-8-1)$$

$$I_2(Xp, Yp) = I_0\left(1 + \cos\left(\frac{k}{m}TAx + \frac{\pi}{2}\right)\right) \qquad (2-8-2)$$

$$I_3(Xp, Yp) = I_0\left(1 + \cos\left(\frac{k}{m}TAx + \pi\right)\right) \qquad (2-8-3)$$

$$I_4(Xp, Yp) = I_0\left(1 + \cos\left(\frac{k}{m}TAx + \frac{3\pi}{2}\right)\right) \qquad (2-8-4)$$

where k is the line frequency of sinusoidal grating. The ray intercept position TAx maybe found as $$TAx(Xp, Yp) = \frac{m}{k}\arctan\left(\frac{I_3 - I_1}{I_4 - I_2}\right) \qquad (2-9)$$

Analog applied derives TAy as follows.

$$TAy(Xp, Yp) = \frac{m}{k}\arctan\left(\frac{I_7 - I_5}{I_8 - I_6}\right) \qquad (2-10)$$

In consequence, the wavefront can be reconstructed from the 2 orthogonal wavefront differentials. Reconstruction methods can be either the least square fit to Zernike coefficient or differential iterations calculation.

When the spatial filter 20 has an opening of a cross hair slit, the same theory applies as the slit with reduced contrast ratio of the observed fringe.

When the spatial filter 20 has an opening of a hole (square hole), the need to rotate the slit is eliminated. The grating modulated in both x and y directions generated on the spatial light modulator is expressed as $$I = I_0[1 + \cos(k(Xa + Ya))] \tag{2-11}$$

$$I_1(Xp, Yp) = I_0\left(1 + \cos\left(\frac{k}{m}(TAx + TAy) + 0\right)\right) \tag{2-12-1}$$

$$I_2(Xp, Yp) = I_0\left(1 + \cos\left(\frac{k}{m}(TAx + TAy) + \frac{\pi}{2}\right)\right) \tag{2-12-2}$$

$$I_3(Xp, Yp) = I_0\left(1 + \cos\left(\frac{k}{m}(TAx + TAy) + \pi\right)\right) \tag{2-12-3}$$

$$I_4(Xp, Yp) = I_0\left(1 + \cos\left(\frac{k}{m}(TAx + TAy) + \frac{3\pi}{2}\right)\right) \tag{2-12-4}$$

Thus $$TAx(Xp, Yp) + TAy(Xp, Yp) = \frac{m}{k} \times \arctan\left(\frac{I_3 - I_1}{I_4 - I_2}\right) \tag{2-13}$$

Another set of cosine grating is generated such that $$I = I_0[1 + \cos(k(Xa - Ya))] \tag{2-14}$$

Thus $$TAx(Xp, Yp) - TAy(Xp, Yp) = \frac{m}{k} \times \arctan\left(\frac{I_7 - I_5}{I_8 - I_6}\right) \tag{2-15}$$

Combining the formulas 2-13 and 2-15, the traverse ray aberration could be solved:

$$TAx(Xp, Yp) = \frac{1}{2}\left[\frac{m}{k} \times \arctan\left(\frac{I_3 - I_1}{I_4 - I_2}\right) + \arctan\left(\frac{I_7 - I_5}{I_8 - I_6}\right)\right] \tag{2-16-1}$$

$$TAy(Xp, Yp) = \frac{1}{2}\left[\frac{m}{k} \times \arctan\left(\frac{I_3 - I_1}{I_4 - I_2}\right) - \arctan\left(\frac{I_7 - I_5}{I_8 - I_6}\right)\right] \tag{2-16-2}$$

After the traverse ray aberrations in both x and y directions are obtained, the exit pupil wavefront can be intergrated from the two traverse ray aberration maps. Using proper ray construction, the surface sag error of any surface in the optical system is obtained.

When the hole is circular, a radial direction phase shifting scheme is used.

Figure 6:
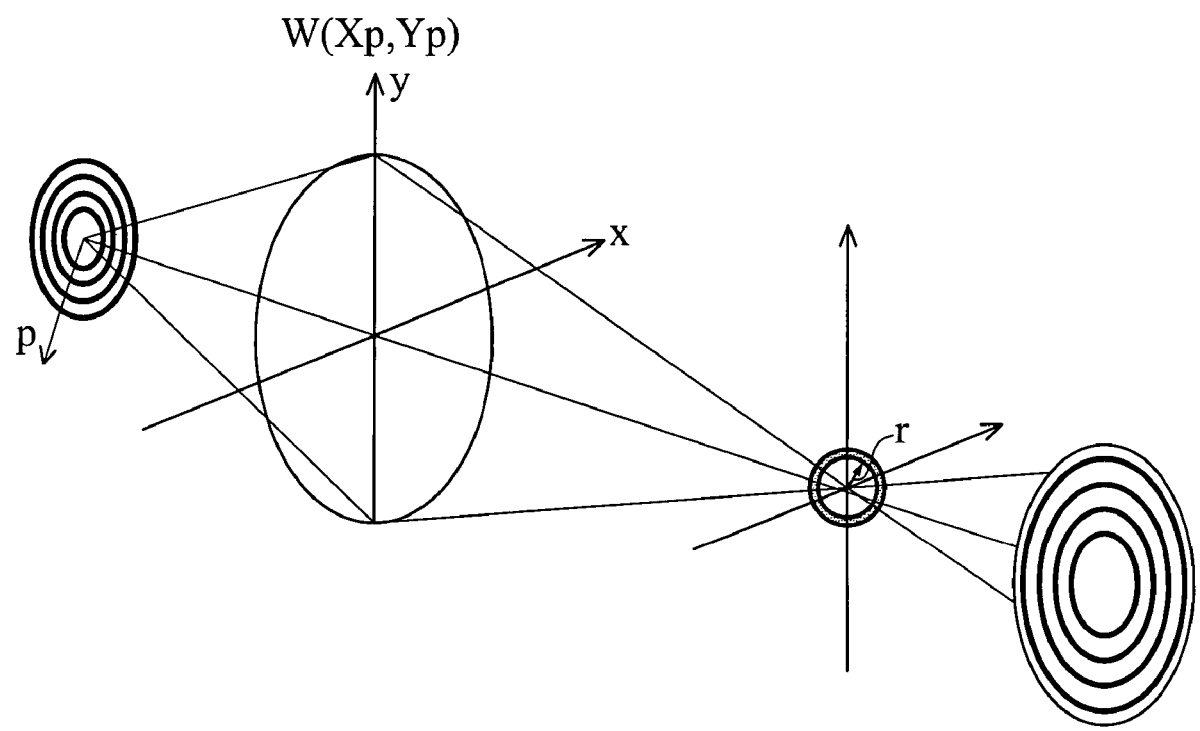
FIG. 6 is a schematic view of the grating slit test method of the invention in a radial coordinate system.

As with the grating-slit test method, this method uses a linear system approximation over finite small field. Rather than measuring the transverse ray aberrations in both X and Y lateral directions, the transverse ray aberration is measured in a radial direction. Thus, the phase shifting grating in object space is modulated in radial direction ρ which can be expressed in the following formula and is shown in FIG. 6.

$$I = \frac{I_0}{2}\left[1 + \cos\left(\frac{2\pi}{P}\rho\right)\right] \tag{2-17}$$

Where P is grating pitch in the object space and the radiance I is uniform at all angular spectrum.

Assume the optics under test have magnification m and the circular hole has radius r, using a similar spatial bucket integration concept as in the grating-slit test method; the fringe contrast ratio can be derived as $$V = \text{sinc}\left(\frac{mP}{2r}\right) \tag{2-18}$$

Measurement is insufficient since the transverse ray aberration is quantified in both ρ and θ directions. However, for an axial symmetrical optical system, there are no aberrations that solely depend on the azimuth direction, θ. That is, all the possible aberrations can be expressed in the Zernike polynomials form.

$$W = \sum_{N=0}^{N=36} (C_N \times Z_N) \tag{2-19}$$

And the Rn(ρ) is never a constant value except the first term, which is simply a constant piston value and generally not regarded as one kind of aberration in terms of phase shifting type optical testing method. Consequently, the radial transverse ray aberration is sufficient to test axial symmetrical optical systems. The only possible contribution source to azimuth angle dependence only aberration is from the non-rotational type fabrication, for example, ion-beam figuring. Even so, the azimuth type aberration error is not commonly seen from fabrication error.

Figure 7A:
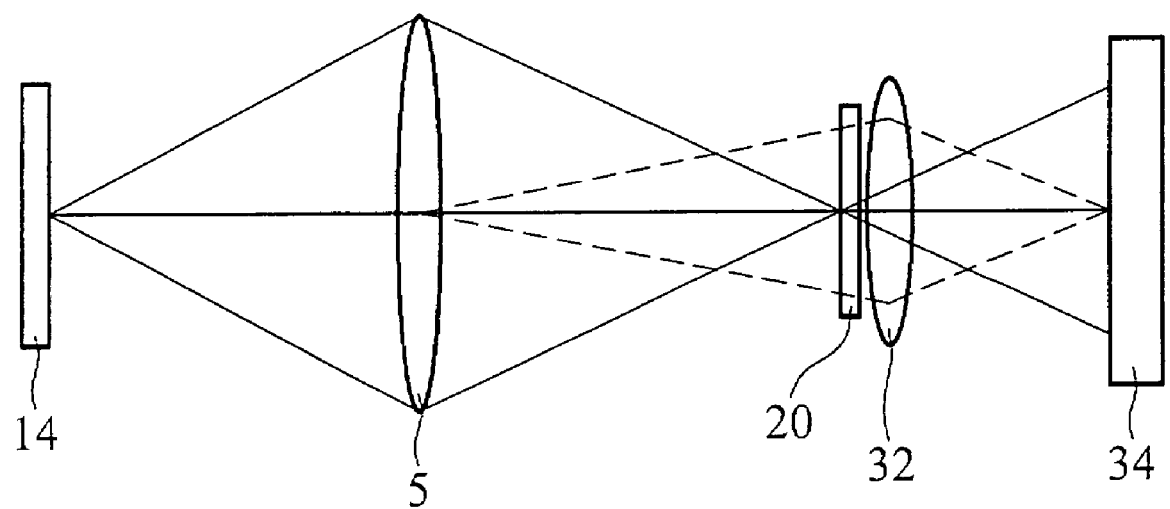
FIG. 7a depicts an embodiment of the measurement of traverse ray aberration at multiple fields.
Figure 7B:
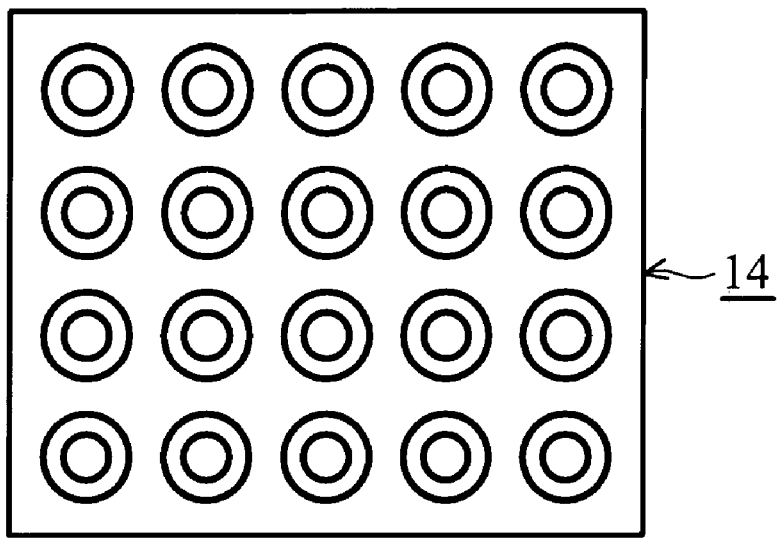
Figure 7C:
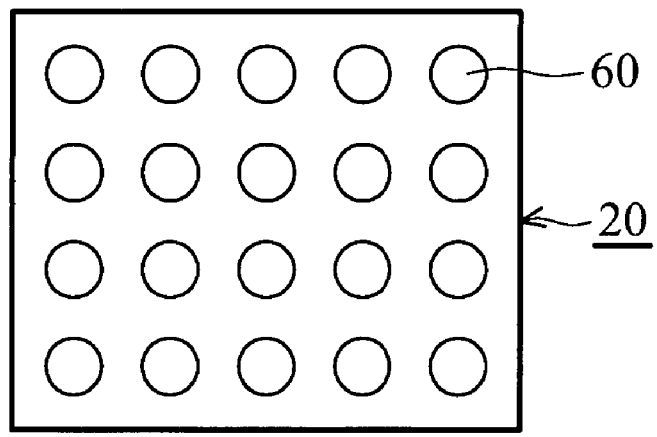

Due to the unique simplicity of the testing method, the radial direction phase shifting to measure transverse ray aberration at multiple fields can be conducted as shown in FIGS. 7a-7c. Thus, each hole 60 in the field filter array (spatial filter 20) can measure the transverse ray aberration at its own position. The overall optical system aberration can be quantified, and the alignment error solved by ray tracing the optical system to fit the measured radial transverse ray aberration at multiple fields. This unique feature is very useful to measure multiple-fields point spread functions.

Figure 8:
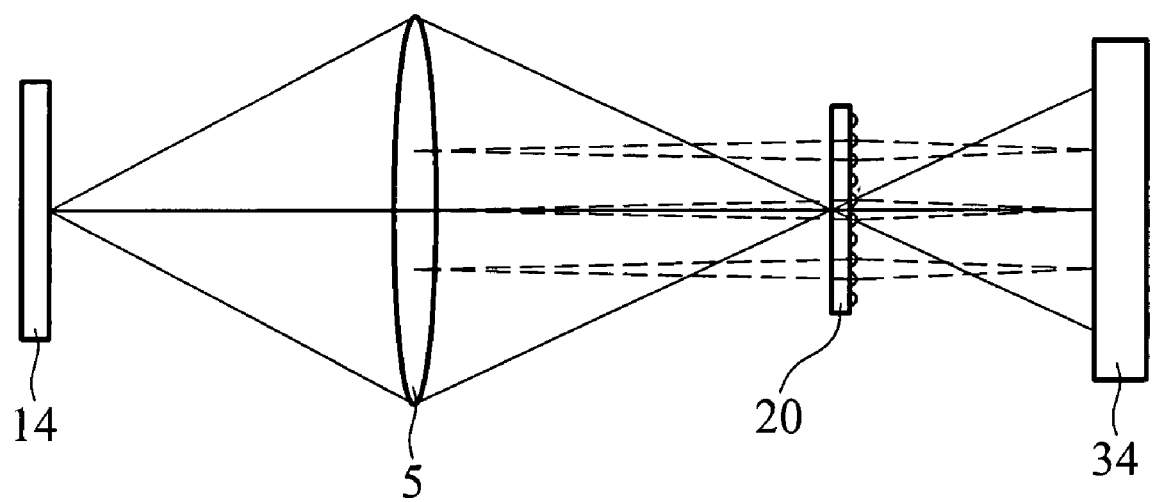
FIG. 8 depicts another embodiment of the measurement of traverse ray aberration at multiple fields.
Figure 9B:
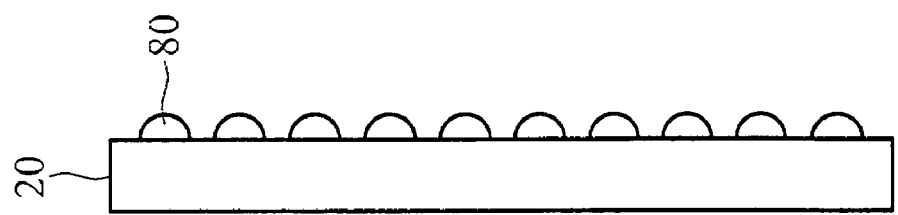
FIG. 9b depicts the micro lens array of FIG. 8.
Figure 9A:
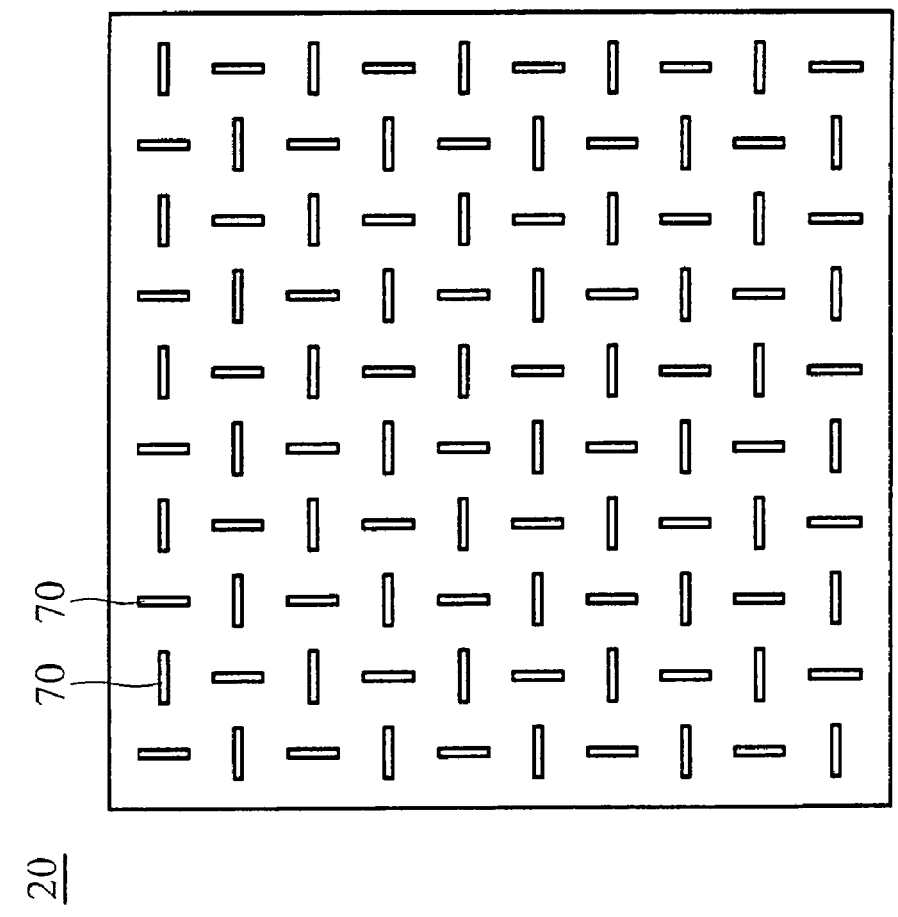
FIG. 9a depicts the slit of the spatial filter of FIG. 8.
Figure 9C:
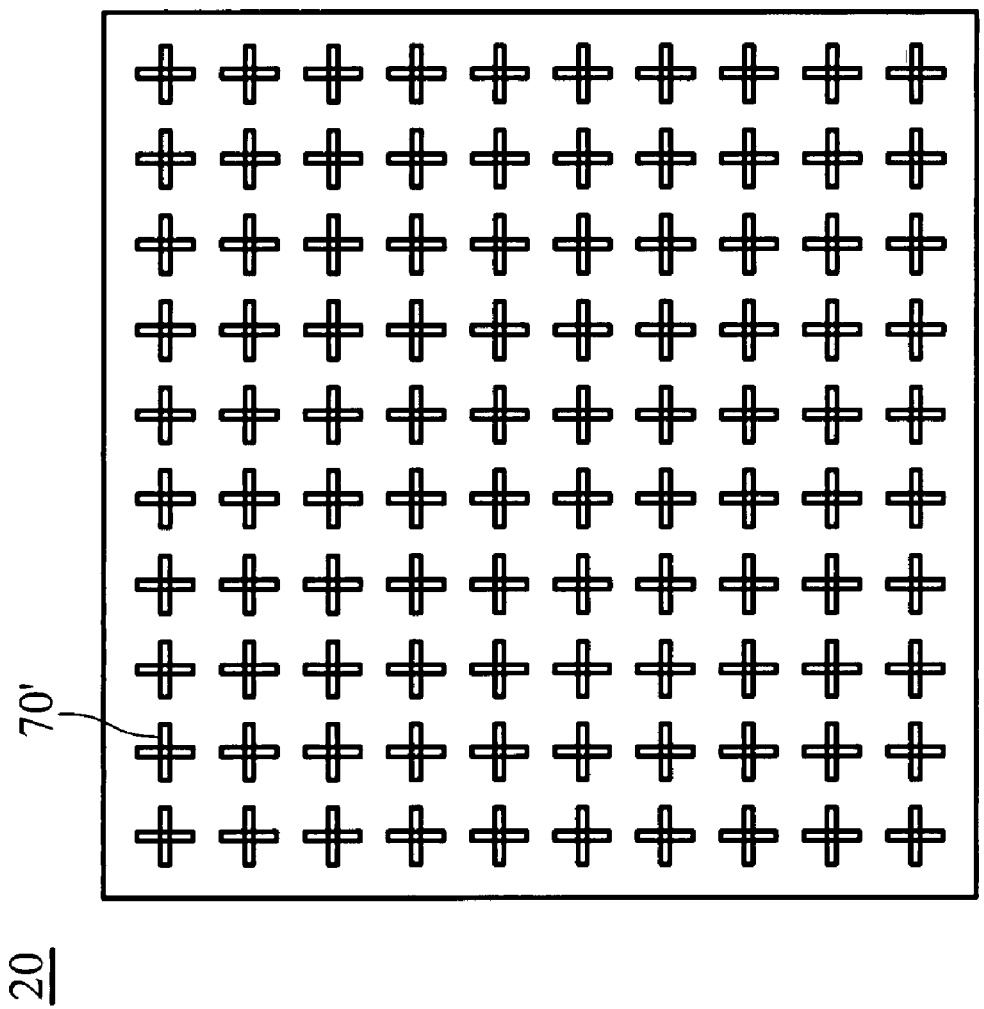
FIG. 9c depicts the cross slit of the spatial filter of FIG. 8.
Figure 9D:
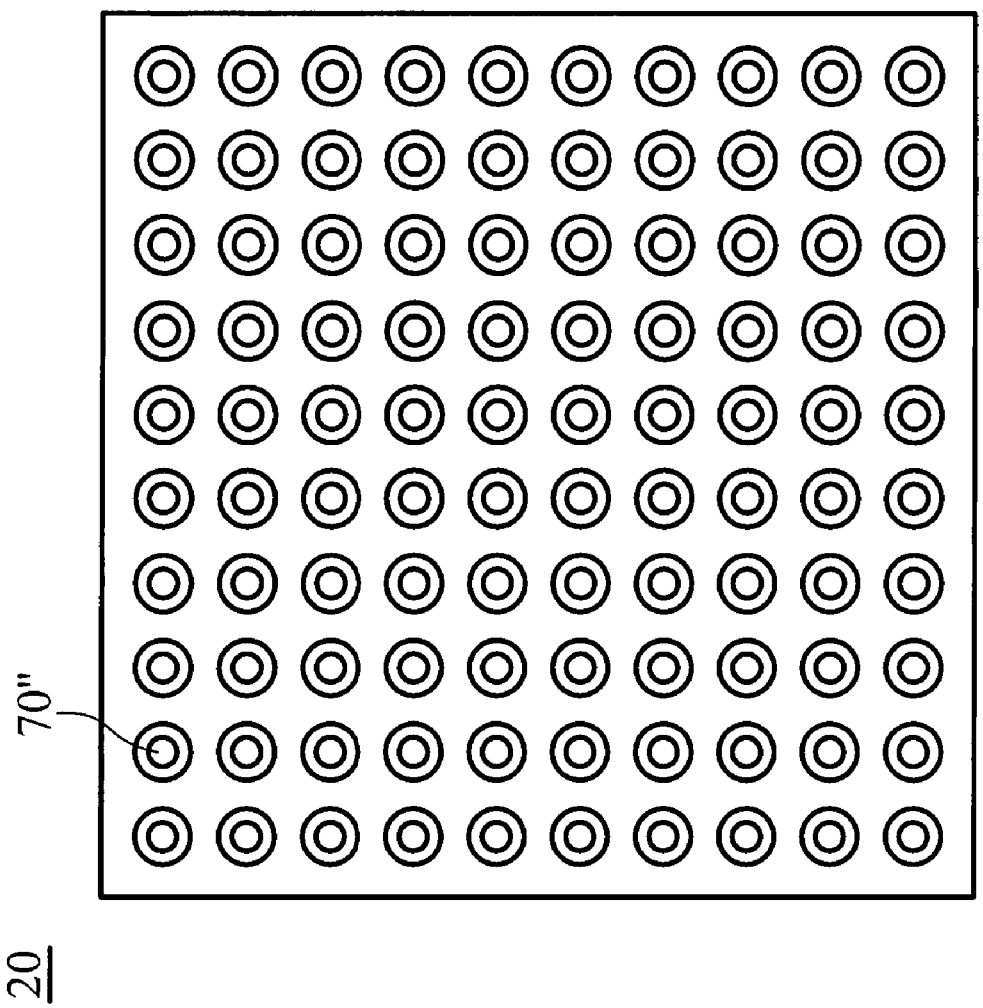
FIG. 9d depicts the circular hole of the spatial filter of FIG. 8.

Although the multi-field grating-slit test setup is a variation on the normal grating-slit test, it can measure multi-field aberrations at the same time. The test setup is shown in FIG. 7a. The single grating-lens combination used in previous grating-slit testing is replaced with a spatial filter 20 with multi-field grating array 70 and the micro-lens array 80 as shown in FIGS. 8, 9a and 9b. The multi-field grating array 70 and the micro-lens array 80 are bonded to each other such that there will be a micro lens behind each grating. The micro lens images the optics under test to the CCD detector plane after light passes through grating modulation. The multi-field grating array 70 can comprise a plurality of slits as shown in FIG. 9a. In another embodiment, the multi-field grating array 70' and multi-field grating array 70" comprise a plurality of cross slits and circular holes as shown in FIG. 9c and FIG. 9d respectively.

Figure 10:
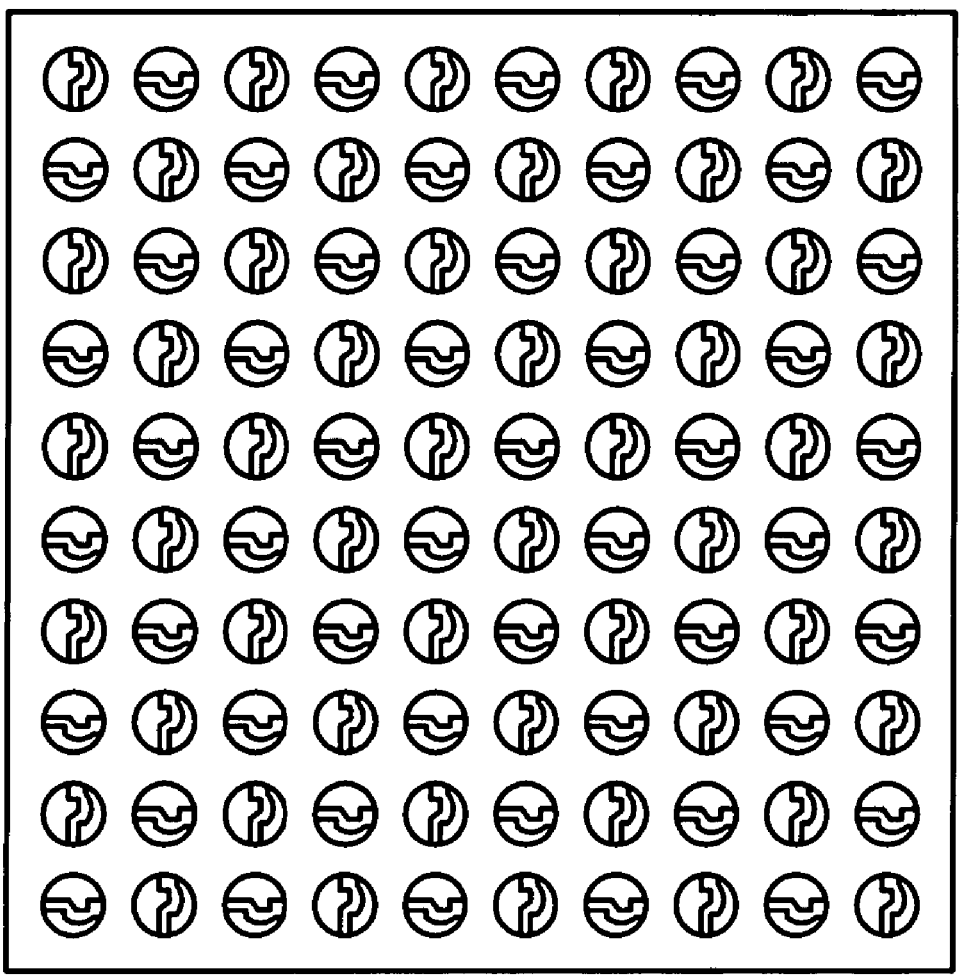
FIG. 10 depicts the fringe pattern formed by the spatial filter of FIG. 8.

After the micro lens array 80 imaging, the fringes form an array of fringes as shown in FIG. 10. Each fringe pattern is the measurement of the transverse ray aberration at a corresponding grating position. For transverse ray aberration functions in both x and y direction, two fringe images are required, one from a horizontal grating and the other from the neighboring vertical grating. Alternatively the X direction fringe images and Y direction fringe images can be parsed from each other, with the phase of each fringe image interpolated such that the X and Y direction phase map is not interleaved, resulting in a corresponding set of X and Y phases at any position of the plane, providing the multi-field transverse ray aberration at once.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system for representing the configuration of a tested element disposed therein, comprising:
   a light source emitting a spatial-incoherent light having a phase shifting scheme toward the tested element and then forming an image with a transverse ray aberration on the image plane of the tested element;
   a spatial filter on the image plane to spatially filter the image formed by the tested element; and
   a detection module comprising a detector for receiving the spatially filtered image.

2. The optical system as claimed in claim 1, wherein the light source comprises:
   a light source emitting a light; and
   a light modulator having a plurality of light valves modulating the light from the light source upon a time controller to generate the spatial-incoherent light having the phase shifting scheme.

3. The optical system as claimed in claim 1, wherein the detection module further comprises a lens unit between the spatial filter and the detector to relay the image formed by the tested element to the detector.

4. The optical system as claimed in claim 3, wherein the spatial filter has an opening to spatially filter the image formed by the tested element.

5. The optical system as claimed in claim 4, wherein the opening is a slit and the spatial filter is moved to scan the image.

6. The optical system as claimed in claim 2, wherein the light source further comprises an integrator to generate an incoherent light incident on the light modulator.

7. The optical system as claimed in claim 6, wherein the light modulator is a liquid crystal panel, an optical MEMS switch or a LCoS, which modulates the incoherent light to emit the spatial-incoherent light having the phase shifting scheme.

8. The optical system as claimed in claim 6, wherein each line of light valves is switched by the time controller and modulates the incoherent light as a sinusodial intensity grating.

9. The optical system as claimed in claim 4, wherein the spatial filter is a slit, a cross slit or a hole.

10. The optical system as claimed in claim 9, wherein the slit or cross slit is rotated to spatially filter the image.

11. The optical system as claimed in claim 1, wherein the spatial filter comprises a plurality of openings arranged in an array.

12. The optical system as claimed in claim 11, wherein the spatial filter further comprises a plurality of lenses arranged corresponding to the openings.

13. The optical system as claimed in claim 11, wherein the opening is a slit.

14. The optical system as claimed in claim 11, wherein the opening is a hole.

15. The optical system as claimed in claim 11, wherein the opening is a cross slit.

16. An optical system for representing the configuration of a tested element disposed therein by calculating the wavefront of wave propagation emitted from the tested element, comprising:
   a light source emitting a spatial-incoherent light having a phase shifting scheme toward the tested element and then emitting the wave propagation which forms an image with a transverse ray aberration on the image plane of the tested element;
   a spatial filter on the image plane to spatially filter the image formed by the tested element; and
   a detection module comprising a lens unit and a detector;
   wherein the lens unit between the spatial filter and the detector to relay the image formed by the tested element to the detector and then the detector receives the spatially filtered image.

17. The optical system as claimed in claim 16, wherein the light source comprises
   a light source emitting a light; and
   a light modulator having a plurality of valves modulating the light from the light source upon a time controller to generate the spatial-incoherent light having the phase shifting scheme.

18. The optical system as claimed in claim 16, wherein the spatial filter has an opening to spatially filter the image formed by the tested element.

19. The optical system as claimed in claim 18, wherein the opening is a slit and the spatial filter is moved to scan the image.

20. The optical system as claimed in claim 17, wherein the light source further comprises an integrator to generate incoherent light incident on the light modulator.

21. The optical system as claimed in claim 20, wherein the light modulator is a liquid crystal panel, an optical MEMS switch or a LCoS, which modulates the incoherent light to emit the spatial-incoherent light having the phase shifting scheme.

22. The optical system as claimed in claim 21, wherein each line of light valves is switched by the time controller and modulates the incoherent light as a sinusodial intensity grating.

23. The optical system as claimed in claim 18, wherein the spatial filter is a slit, a cross slit or a hole.

24. The optical system as claimed in claim 23, wherein the slit or cross slit is rotated to spatially filter the image.

25. The optical system as claimed in claim 16, wherein the spatial filter comprises a plurality of openings arranged in an array.

26. The optical system as claimed in claim 25, wherein the spatial filter further comprises a plurality of lens arranged corresponding to the openings.

27. The optical system as claimed in claim 25, wherein the opening is a slit.

28. The optical system as claimed in claim 25, wherein the opening is a hole.

29. The optical system as claimed in claim 25, wherein the opening is a cross slit.

* * * * *